United States Patent Office 2,768,038
Patented Oct. 23, 1956

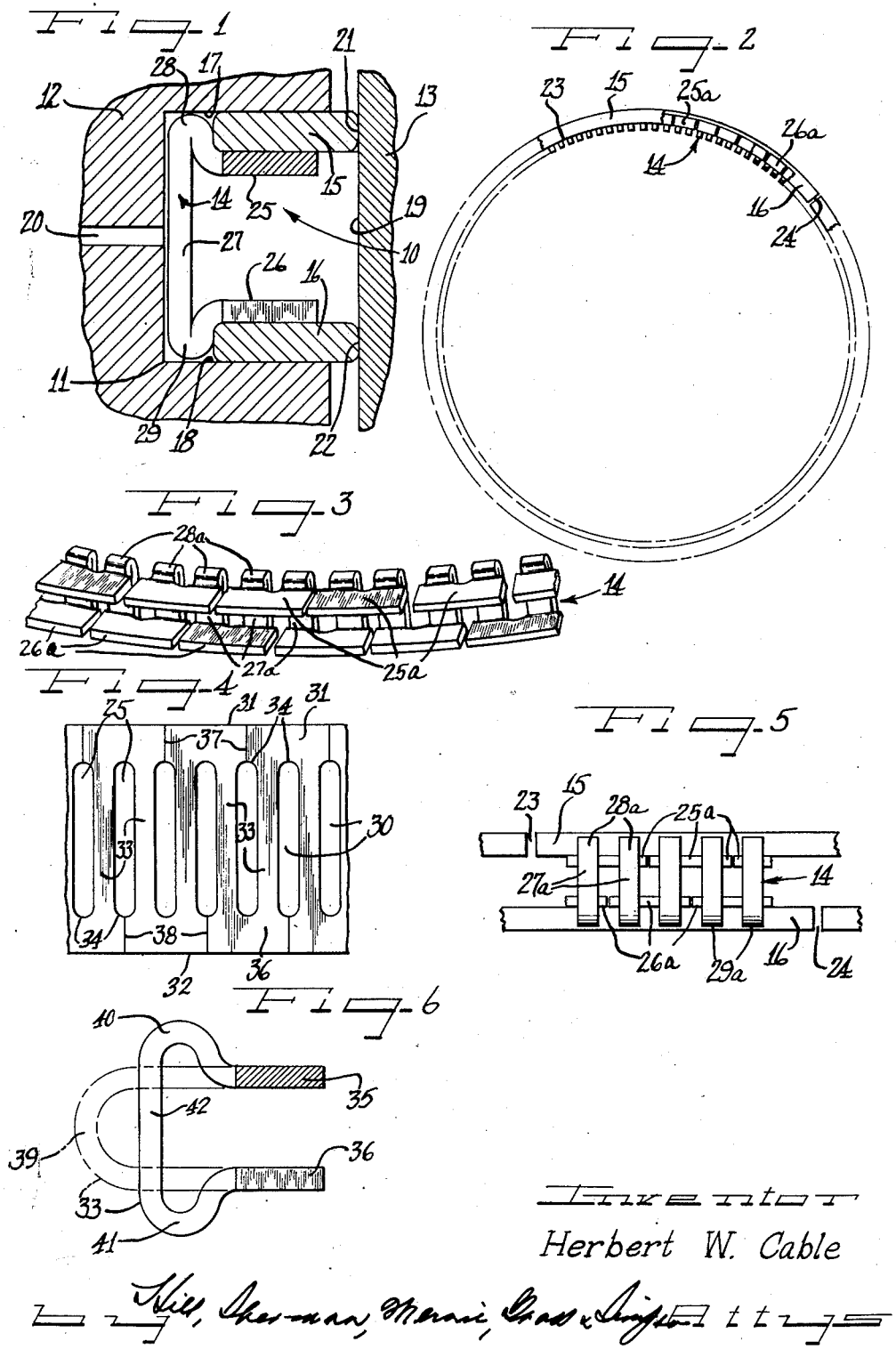

2,768,038

PISTON RING

Herbert W. Cable, Cleveland Heights, Ohio, assignor to Thompson Products, Inc., Cleveland, Ohio, a corporation of Ohio Application December 30, 1953, Serial No. 401,165

9 Claims. (Cl. 309—24)

The present invention relates to a piston ring and more particularly relates to a piston ring assembly having thin rings and an expander-spacer ring.

Still more particularly, the present invention relates to a new and improved expander-spacer ring for a packing ring assembly or the like as an oil ring on a piston which is reciprocable within a cylinder such as will be found in an internal combustion engine.

Packing rings and oil sealing rings and the like of this class employ thin oil rings or rails which are held against the radial walls of the oil ring groove and against the cylinder wall by an expander-spacer ring which is preferably resilient and which should be operative to expand the rails or thin rings into close peripheral engagement with the cylinder and in preferably sealing engagement with the radial faces of the oil ring groove in the piston. The thin rings or rails should also have a hardened outer peripheral or circumferential edge in contact with the cylinder wall to reduce the rate of wear on these rings, etc.

An important feature of packing rings lies in the expander-spacer ring which should impart substantially uniform peripheral expansion to the thin rail rings so that wear on the rail rings will be substantially uniform thereabout.

An important feature of the present invention is, therefore, to provide a new and improved expander-spacer ring which will support the thin rail rings of the packing ring assembly and provide substantially uniform expansion forces for the rail rings.

Further, an important feature of the present invention is to provide a new and improved expander-spacer ring which is very economical and easy to construct. Expander-spacer rings embodying the principles of the present invention have substantially true circumferential expansion and provide a great number of pressure parts on the thin rail rings thereby having a more uniform pressure distribution thereabout. In addition, packing rings embodying the principles of the present invention provide an expander-spacer ring pressure which tends to wedge the rails against the piston land or radial faces of the oil ring groove at the outside edges thereof resulting in better oil sealing.

Still further, packing rings employing expander-spacer rings of the present invention may be made to relatively loose tolerances by virtue of the improved construction features thereof and may be made from lower carbon steels than heretofore known types of rings of this class thereby providing another source of economy.

An expander-spacer ring incorporating the principles of the present invention is preferably formed from strip metal stock having narrow and elongated, centrally positioned, aligned transversely extending closely spaced slots therein leaving a border along the marginal edges of the stock. Cuts are provided transversely through the borders at alternate slot center lines such that one border is cut at first and third slot center lines while the other border is cut at second and fourth slot center lines thereby leaving the stock to be continuous through a zigzag path.

The stock is thereafter preferably bent to an elongated U-shaped configuration with the cut marginal edges lying in parallel planes and the bight portion of the U is then flattened or the like to form a reverse bend in the region where the legs of the U or marginal portions of the stock join the bight of the U. At the same time the stock is formed into a ring with the flattened bight portions lying along the inner periphery of the ring and with the slit or cut marginal portions or legs extending radially to the outer periphery of the ring.

When so formed the ring will be provided with a pi ($\pi$) cross sectional configuration with the reverse bent or folded regions extending axially above and below the upper and lower legs to form thin ring contacting shoulders which will urge the rings resiliently outwardly at the numerous points of contact thereof.

It is, therefore, an important object of the present invention to provide a new and improved expander-spacer ring for packing ring assemblies wherein the expander ring has a pi cross sectional configuration with radially extending resilient ring supporting legs and with portions of the cross bar of the ring extending axially above and below upper and lower legs to form thin ring-urging contact shoulders while the cross bar lies on the inner periphery of the ring.

Another object of the present invention is to provide a new and improved expander-spacer ring having an inner peripheral flattened bight portion of a U-shaped ring.

Still another object of the present invention is to provide a new and improved packing ring assembly having an expander-spacer ring provided with substantially continuous upper and lower ring supporting legs and closely spaced axial cross bars adjoining the upper and lower legs and extending above and below the same to contact and resiliently position thin rings or rails within the oil ring groove of a piston or the like.

Still other objects, features and advantages of the present invention will become readily apparent to those skilled in the art from the following detailed description of the principles of the present invention and a preferred embodiment thereof, from the claims, and from the accompanying drawings in which each and every detail shown is fully and completely disclosed, in which like reference numerals refer to like parts, and in which:

Figure 1 is a fragmental cross sectional view of a packing ring assembly embodying the principles of the present invention shown in the oil ring groove of a piston or the like and reciprocally disposed within a cylinder;

Figure 2 is a top plan view of the packing ring assembly with portions thereof broken away to clearly illustrate other portions thereof;

Figure 3 is a fragmental perspective view of an expander-spacer ring embodying the principles of the present invention;

Figure 4 is a fragmental plan view of a formed blank from which an expander-spacer ring embodying the principles of the present invention may be constructed;

Figure 5 is a fragmental inner pheripheral elevational view of an expander-spacer ring incorporating the principles of the present invention; and, Figure 6 is a cross-sectional view of an expander-spacer ring showing intermediate stages of construction.

As shown on the drawings, a packing ring assembly 10 incorporating the principles of the present invention, when disposed in the oil ring groove 11 of a piston 12 reciprocally positioned within a cylinder or the like 13, of an internal combustion engine or the like, as an example, will be provided with a resilient expander-spacer ring 14 which will resiliently urge the thin rail rings 15 and 16 against the upper and lower radial faces 17 and 18 of the oil ring groove in substantially sealing relation therewith and against the face 19 of the cylinder wall also in substantially sealing relation therewith.

Although packing rings incorporating the principles of the present invention may be employed in any convenient and appropriate piston-cylinder assembly it has been shown here in combination with an internal engine piston and cylinder merely by way of example and not by way of any desired limitation on the disclosure. In an internal combustion engine the piston is frequently provided with oil ports 20 which permit the passage of oil from the oil ring groove.

The thin rail rings 15 and 16 are preferably formed from a resilient material such as spring steel or the like having outer peripheral marginal regions 21 and 22 respectively which are chromium coated or otherwise hardened for a long life wear against the cylinder wall or face. The expander rails 15 and 16 may have their cylinder contacting marginal portions 21 and 22 chromium coated or alloyed with a chromium content at the outer peripheral extremity thereof varying from the chromium content radially inwardly therefrom whereby the portion of the expander rails contacting the cylinder wall initially will be provided with quick break-in qualities and characteristics and thereafter will have a gradually changing chrome content to provide for longer life of the cylinder wall in addition to long life for the rails themselves.

To permit the thin rail rings 15 and 16 to expand and contract in accordance with the diametric dimensions of the cylindrical face 19 of the cylinder 13, as the rings are urged thereagainst by the expander-spacer ring 14, the thin rail rings 15 and 16 are each provided with a radial cut or split 23 and 24, respectively, as illustrated in Figures 2 and 5. Thus, should the diametric dimension of the cylinder increase, the expander-spacer ring 14 will bear radially outwardly against the rails 15 and 16, expanding the rail rings 15 and 16 into peripheral engagement and substantially sealing engagement with the side walls of the cylinder. The very small quantity of oil leakage through the thin ring slits 23 and 24 will not be detrimental to efficient operation and will not be sufficiently large to be of any other detriment to the system in which the packing ring is placed or to the packing ring itself.

The expander-spacer ring 14 of the packing ring assembly 10 maintains the thin rings 15 and 16 against the radial face 17 and 18 of the oil ring groove 11 by resiliently urging radially extending legs 25 and 26 axially against the thin rings, respectively. These legs 25 and 26 are resiliently formed integrally with axially extending crossbars 27 which are joined to the radial legs 25 and 26 through reverse folds or the like 28 and 29, respectively, at the upper and lower ends of the crossbar 27 (viewed in cross-section in Figure 1). It will also be seen from Figure 1 that by this construction the expander-spacer ring 14 has a pi cross-sectional configuration, with the extremities of the crossbar 27 extending axially beyond the planes of the radial legs 25 and 26. These axial extensions are preferably slightly less than the thickness of the thin rings 15 and 16 (note Figures 1 and 5) and provide radial abutment shoulders for resiliently engaging the thin rings 15 and 16 and urging the same radially outwardly into engagement with the cylinder wall face 19.

In the detailed construction of the expander-spacer ring 14 as viewed in Figure 3, the radially extending legs 25 and 26 are actually formed from a plurality of radially outwardly extending leg sections 25a and 26a, respectively. The leg segments 25a and 26a are each closely spaced and form substantially continuous circular platforms to axially, facially engage the thin rings 15 and 16 substantially continuously about the entire circular length thereof when in assembly as illustrated in Figures 1, 2 and 5.

The crossbar 27 is also formed by a plurality of crossbar segments 27a and respectively resiliently hold the leg segments 25a and 26a in proper assembled relation.

More specifically, the crossbar segments 27a are so joined to upper and lower leg segments that two crossbar segments 27a are integral with each leg segment but also so that no two adjacent crossbar segments are integral with both the same upper leg segment 25a and the same lower segment 26a. That is, while each crossbar segment 27a is integral with an upper leg segment 25a and a lower leg segment 26a, considering any one leg segment 27a, an immediately adjacent crossbar segment or crossbar 27a will be integral with either the same upper leg segment or the same lower leg segment, and will further be integral with an adjacent lower leg segment or an adjacent upper leg segment, respectively, etc. By this arrangement first upper and lower leg segments will be integral with the same crossbar. A second crossbar will be integral with the first upper leg segment and integral with a second lower leg segment; and a third crossbar will be integral with the second lower leg segment and integral with a second upper leg segment, etc. By this arrangement there is provided a continuous zig-zag path through the material forming the resilient expander-spacer ring 14 in such a manner that the expander-spacer ring will be circumferentially resilient in toto and have axially resilient upper and lower radially extending legs.

To form an expander-spacer ring embodying the principles of the present and in accordance with a preferred method following those principles, there is shown in Figure 4 a fragment of an elongated strip of material which has been punched to have transversely extending slots 30 substantially equidistantly spaced from the marginal edges 31 and 32 of the strip and substantially equidistantly spaced from each other longitudinally of the strip, thereby leaving transversely extending strap or crossbar-like sections 33 between the punched-out portions 30. Further, the punched-out portions 30 are preferably long and narrow, having a much greater dimension transversely than longitudinally of the strip, and are shown with rounded, substantially semi-circular end portions 34. The end portions of the slots may of course, be square or shaped otherwise than rounded as desired. The marginal portions 35 and 36 lying between the ends 34 of the punched-out regions 30, and the marginal edges 31 and 32, respectively, correspond in width transversely of the strip to the radial dimension of the radially extending legs 25 and 26 of the expander-spacer ring 14, and ultimately form those legs.

To this end, and to divide the legs into segments permitting circumferential expansion thereof, the marginal regions 35 and 36 are transversely split or cut as at 37 and 38, respectively, through alternate end portions 34 to the marginal edges 31 and 32. That is, while the slits or cuts 37 in the marginal edge portion 35, forming the radially extending leg segments 25, are transversely extended from first, third and fifth punch apertures 30 to the marginal edge 31, the slits or cuts 32 through the marginal region 36, forming the lower radially extending leg segments 26, extend from the ends of second, fourth and sixth, etc., punch apertures 30 to the marginal edge 32.

After the strip has been punched and cut in the manner described a preferred method of forming the ring includes cutting it to an appropriate length to form the expander-spacer ring or resilient ring 14 and is then bending it into a substantially U-shaped configuration with the marginal edge portions 35 and 36 disposed substantially parallel to each other and with the straps or bar-like members 33 taking all of the U-bend. With the thus formed strip having a cross-sectional U-shape and extending longitudinally for its full length, the strip is then formed into a substantially circular ring and the bight portion 39 of the U is flattened, first through an intermediate flattening stage as shown by solid lines in Figure 6, to have smoothly bent reverse folds 40 and 41 therein, with a substantially flattened bight portion as indicated at 42, and then is fully flattened to the shape and form shown in Figure 1, with tightly closed reversed folds 28 and 29 and with fully flattened crossbars extending therebetween on the inner periphery of the expander-spacer ring.

Although the form of ring shown in solid lines in Figure 6 may be employed successfully as a finally constructed ring, in the final construction as fragmentally viewed perspectively in Figure 3, the end portions 34 of the slots or punched apertures 30 between the crossbar segments 27a terminate substantially at the termination of the reverse folds 28 and 29 and extend slightly radially outwardly therefrom into the leg segments 25a and 26a and between the same.

This construction provides the leg segments 25a and 26a with substantially full, solid faces to bear against and support the thin rings 15 and 16 in a most desirable manner and substantially sealingly against the radial faces to bear against and support the thin rings 15 and 16 in a most desirable manner and substantially sealingly against the radial face of the oil ring groove 11. So, too, the reverse bends 28a and 29a on each of the crossbar segments 27a provide abutment shoulders against the inner periphery of the thin rings 15 and 16 and are closely spaced, as shown in Figure 2, to thereby provide a multiplicity of points of contact against the thin rings to thereby substantially uniformly expand the thin rings and permit substantially uniform and even peripheral contraction of the thin rings.

The expander-spacer ring so formed is expandably resilient and is constructed to seat with its crossbars 27a (or the bight portion of the ring) radially adjacent to the base of the oil ring groove to hold the resilient rail rings uniformly expanded outwardly against the radial faces of the oil ring groove and against the cylinder wall 19. Further, the reverse bends 28 and 29 in the expander-spacer ring give outward resilience to the legs or leg segments to sealingly urge the thin rings against the radial faces of the oil ring groove.

From the foregoing it will be readily observed that numerous variations and modifications may be effected without departing from the true spirit and scope of the novel concepts and principles of the invention. I, therefore, intend to cover all such modifications and variations as fall within the true spirit and scope of the novel concepts and principles of my invention.

I claim as my invention:

1. An oil ring assembly for a piston to resiliently engage the wall of a cylinder or the like, comprising a pair of radially expandible thin oil rings and an expander-spacer ring disposed axially between said oil rings, said expander-spacer ring being substantially U-shaped to have a plurality of upper and lower ring supporting legs and a bight portion, the bight portion of the expander-spacer ring forming the inner periphery of the expander-spacer ring.

2. A packing assembly for disposition in an oil ring groove of a piston reciprocably positioned in a cylinder, comprising, a pair of peripherally expandible split rail rings, and an expander-spacer ring disposed between said rail ring to expand the same, said expander spacer ring being substantially U-shaped and formed with axially disposed shoulder like portions at the bight thereof and arranged with the bight thereof as the inner peripheral portion thereof.

3. An expander-spacer ring for packing assemblies comprising, an expandible spring ring formed from resilient material, said ring being substantially U-shaped and having a bight portion and upper and lower leg portions to resiliently support a pair of rail rings, said bight portion lying on the inner periphery of the ring and being substantially flattened with reverse upper and lower bends therein projecting above and below the upper and lower leg portions respectively.

4. An expander-spacer ring for packing assemblies comprising a substantially U-shaped ring of resilient material having its bight portion substantially flattened about the inner periphery of the ring and integral shoulders formed on said ring and extending axially from said flattened bight portion as an integral part thereof.

5. An expander-spacer ring for packing assemblies comprising a substantially pi cross-sectional shaped ring of resilient material.

6. An expander-spacer ring for packing assemblies comprising, a substantially continuous ring of resilient material formed into a substantially pi shaped axial cross section having legs and a cross bar with the cross bar lying on the inner periphery of said ring.

7. An expander-spacer ring for packing assemblies comprising a substantially pi cross-sectionally shaped ring of resilient material having a plurality of upper and lower thin ring supporting legs and a plurality of cross bars along the inner periphery of the ring, each of said cross bars being formed integrally with an upper and a lower leg and each of said legs being formed integrally with a pair of adjacent cross bars.

8. An expander-spacer ring for packing assemblies comprising a substantially pi cross-sectionally shaped ring of resilient material having a plurality of upper and lower thin ring supporting legs and a plurality of cross bars along the inner periphery of the ring, each of said cross bars being formed integrally with an upper and a lower leg and each of said legs being formed integrally with a pair of adjacent cross bars, said upper and lower legs further being staggered whereby an adjacent pair of cross bars are joined together through a single leg.

9. An expander-spacer ring for packing assemblies comprising a substantially pi cross-sectionally shaped ring of resilient material having a plurality of upper and lower thin ring supporting legs and a plurality of cross bars along the inner periphery of the ring, each of said cross bars being formed integrally with an upper and a lower leg and each of said legs being formed integrally with a pair of adjacent cross bars, said upper and lower legs further being staggered whereby an adjacent pair of cross bars are joined together through a single leg, the ends of said cross bars extending above and below said upper and lower legs respectively.

References Cited in the file of this patent

UNITED STATES PATENTS

| | | |
|---|---|---|
| 2,358,239 | Mason | Sept. 12, 1944 |
| 2,362,286 | Mason | Nov. 7, 1944 |
| 2,596,286 | Phillips | May 13, 1952 |